US005615966A

United States Patent [19]

Jarvis et al.

[11] Patent Number: 5,615,966

[45] Date of Patent: Apr. 1, 1997

[54] DEVICE FOR CONNECTING A FIRST ELONGATE MEMBER TO TRANSVERSE SECOND ELONGATE MEMBER

[76] Inventors: Barry M. F. Jarvis; Carolyn E. Morse, both of 10222 Hammerley No. 222, Houston, Tex. 77043

[21] Appl. No.: 390,640

[22] Filed: Feb. 17, 1995

[30] Foreign Application Priority Data

Feb. 18, 1994 [GB] United Kingdom .................. 9403141

[51] Int. Cl.$^{6}$ ........................................ E04G 7/00

[52] U.S. Cl. ........................... 403/49; 182/179; 403/322

[58] Field of Search ............................ 182/179; 403/49, 403/320, 321, 322

[56] References Cited

U.S. PATENT DOCUMENTS

| | | | |
|---|---|---|---|
| 2,603,513 | 7/1952 | Greitzer | 403/321 X |
| 2,674,476 | 4/1954 | Del Grosso | 403/49 |
| 2,714,751 | 8/1955 | Stuart et al. | 403/321 X |
| 3,992,118 | 11/1976 | Siegers | 403/171 |
| 4,039,264 | 8/1977 | Sharp | 403/246 |
| 4,090,798 | 5/1978 | Barton | 403/171 |
| 4,180,342 | 12/1979 | Layher | 403/24 |
| 4,273,463 | 6/1981 | Dobersch | 403/246 |
| 4,369,859 | 1/1983 | Smits | 182/179 |
| 4,445,307 | 5/1984 | Puccinelli et al. | 52/638 |
| 4,943,181 | 7/1990 | Murphy | 403/322 X |
| 5,078,532 | 1/1992 | Williams | 403/246 |

FOREIGN PATENT DOCUMENTS

| | | |
|---|---|---|
| 0004179 | 9/1979 | European Pat. Off. . |
| 4242031 | 6/1994 | Germany . |
| 1055268 | 1/1967 | United Kingdom . |
| 2177451 | 11/1988 | United Kingdom . |
| 2236373 | 4/1991 | United Kingdom . |
| WO82/02733 | 8/1982 | WIPO . |

*Primary Examiner*—Blair Johnson
*Assistant Examiner*—Andrea Chop
*Attorney, Agent, or Firm*—Barnes & Thornburg

[57] ABSTRACT

The device includes a locator on the first member for locating an end section of the second member. A movable locking lever is mounted on the second member and an operating member is provided which enables the locking lever to be moved from a position in which the end section is locked in position on the locator by the locking lever to a further position in which the locking lever permits the end section to be separated from the locator. The operating member is a rotary member rotatable about the longitudinal axis of the second member and has a surface thereon which co-operates with the locking lever whereby rotation of the rotary member effects movement of the locking lever.

29 Claims, 4 Drawing Sheets

12 13 14 III 26 17 22 16 23 29a 29 25 13 37 27 19 24 12 $P_1$ 30 14 28 38 37a 18 10 28 III 32 29 30 36 35 33 28

19
32
A
29
26
39
39
V
19
19
34
30
30
27
33
28

32
A
30
37a
33
28c
36
28a
35
28b
29
34
37

32
29
30
36
35
33
28

23
17
29
VII
40
44
16
46
43
45
18
28
VII 29
51
47
43
VII
VII
46
43a
39
44
18
34

28

43a
43
44
42
45
18
47
46
29

53
48
51
52
50
44
B
46
49
29
26
46
39

53
48
52
29
60
47
44
62
B
50
46
39
26

DEVICE FOR CONNECTING A FIRST ELONGATE MEMBER TO TRANSVERSE SECOND ELONGATE MEMBER

BACKGROUND AND SUMMARY OF THE INVENTION

The invention relates to a device for connecting a first elongate member to a transverse second elongate member and is particularly, but not exclusively, concerned with a device for connecting together scaffolding tubes.

Over the years, various types of connectors have been proposed for interconnecting scaffolding tubes. In one arrangement, a locator on one of the tubes co-operates with an end section of the tube to be connected thereto and a wedge element is inserted and hammered into position to secure the end section to the locator. Examples of such systems are described in UK Patent Application Ser. No. 2 236 373, WO82/02733, U.S. Pat. Nos. 4,445,307, 4,273,463 and 4,180,342. The wedge system has drawbacks, in particular the need for a separate wedge element which can be dropped or lost. U.S. Pat. No. 5,078,532 does not involve the use of a wedge but a separate pin-like retainer is required to hold a movable latch member in its locking position.

In another system described in U.S. Pat. No. 3,992,118 a rotary clamping bush is provided on a vertical scaffolding member which is arranged to retain tongues provided on horizontal scaffolding member. The drawback with such a system is that where several horizontal scaffolding members are to be secured to the vertical member, all the horizontal members have to be correctly positioned before the clamping bush is rotated to clamp the tongues in position. Therefore, it follows that it is not possible to release and re-position one of the horizontal members without also releasing the others which can be undesirable particularly if the others are load bearing. An object of the present invention is to provide an improved type of device which can be used to interconnect scaffolding tubes and other elongate members.

According to the invention there is provided a device for connecting a first elongate member to a transverse second elongate member, the device comprising a locator on the first member for locating an end section of the second member, a movable locking means on the second member and an operating member which enables the locking means to be moved from a position in which the end section is locked in position on the locator by the locking means to a further position in which the locking means permits the end section to be separated from the locator, the operating member being a rotary member mounted on the second member and having a surface thereon which co-operates with the locking means whereby rotation of the rotary member effects movement of the locking means. The use of the rotatable operating member provides a secure connecting device which does not require the use of loose wedges or pins and which is simple to operate and enables individual second members to be connected to and disconnected from the first member without disturbing others.

Preferably, the operating member is mounted on the second member for rotation, e.g., about the longitudinal axis of the second member.

The operating member may be sleeve-like.

In a preferred embodiment, the operating member co-operates with a section of the locking means in a cam-like manner. Preferably, movement of the operating member relative to the locking means to lock the end section in position on the locator causes a cam-like surface on the operating member to displace a co-operating section of the locking means. Preferably, two opposite cam-like surfaces are provided one of which moves the locking means towards a locked position when rotating the operating member in one sense and the other of which moves the locking means towards an unlocked position when rotating the operating member in an opposite sense. In that way, both a positive locking and unlocking movement of the locking means is provided by the cam-like surfaces so that there is reduced likelihood of the locking means sticking in its locked position when disconnection of the elongate members is required Where the operating member is in the form of a sleeve, the cam-like surface may be defined by a circumferentially extending slot in the sleeve, the slot also extending axially of the sleeve whereby rotational movement of the sleeve about its axis will cause the surface of the slot to displace the co-operating section of the locking means. Preferably, one surface of the slot displaces the co-operating section of the locking means in a locking direction during rotation of the sleeve in one sense and an opposite surface of the slot displaces the co-operating section of the locking means in an unlocking direction during rotation of the sleeve in an opposite sense.

The locking means is preferably arranged to move into a locking position such that a locking surface of the locking means lies adjacent part of the locator with the locator disposed in captive-manner between the locking surface of the locking means and the end section of the second elongate member.

Preferably, the operating member is movable between limits of travel and causes the locking means to move into a locking position before reaching one of its limit of travel. Further movement of the operating member up to that limit of travel then causes a locking force to be exerted on the locking means to clamp the locator between the end section and the locking means.

The locking means is preferably in the form of a lever pivotally mounted, e.g., on the second elongate member adjacent the end section. The locking means may be pivotally mounted on a carrier on the second member. The carrier is preferably integral with the said end section of the second member. In such a case, the end section is preferably axially spaced from the adjacent part of the second member and the aforesaid carrier is disposed therebetween.

The locking means is preferably mounted within a slot in the carrier and part of the locking means may project through the slot for co-operation with the operating member.

Where the locking means is mounted on the carrier, the operating member may be in the form of the aforesaid sleeve which is also mounted on the carrier, the sleeve being rotatable around the carrier for co-operation with the locking means.

If desired, secondary lock means may be provided to prevent unwanted movement of the operating member once the operating member has moved the locking means into a position where the end section is locked in position on the locator.

The secondary locking means may comprise a releasable member which, in a locking position, engages the operating member to prevent movement thereof and which, in a release position, permits movement of the operating member.

The releasable member may be resiliently biased into a locking position.

The secondary locking means may be provided on the aforesaid carrier for co-operation with the said operating member.

The said releasable member may comprise a resiliently mounted radial projection which extends past an edge of the operating member, e.g. an edge of an aperture in the operating member, to prevent movement of the operating member and which is displaceable to permit movement of the operating member.

An unlocking device, e.g. in a form of a wrench, may be provided for moving the secondary locking means from a locking position to or towards a release position. The unlocking device may include a first section arranged to locate on part of the operating member and a second section provided with a surface which is arranged to move the secondary locking means from its locking position to or towards its release position. In one embodiment the unlocking device displaces the secondary locking means into its release position whilst in another embodiment the unlocking device displaces the secondary locking means towards its release position and the operating member is formed with a ramp-like surface which, on rotation of the operating member to release the locking means, further displaces the secondary locking means into its release position.

BRIEF DESCRIPTION OF THE DRAWINGS

A device in accordance with the invention will now be described by way of example with reference to the accompanying drawings in which.

DETAILED DESCRIPTION OF THE DRAWINGS

A vertical scaffolding tube 10 (constituting the aforesaid first elongate member) has welded thereto a series of vertically spaced annular locators 12. Each locator comprises an annular upward projection 13 of inverted U or V shape, the outer edge of which terminates in a downwardly projecting rim 14.

Figure 1:
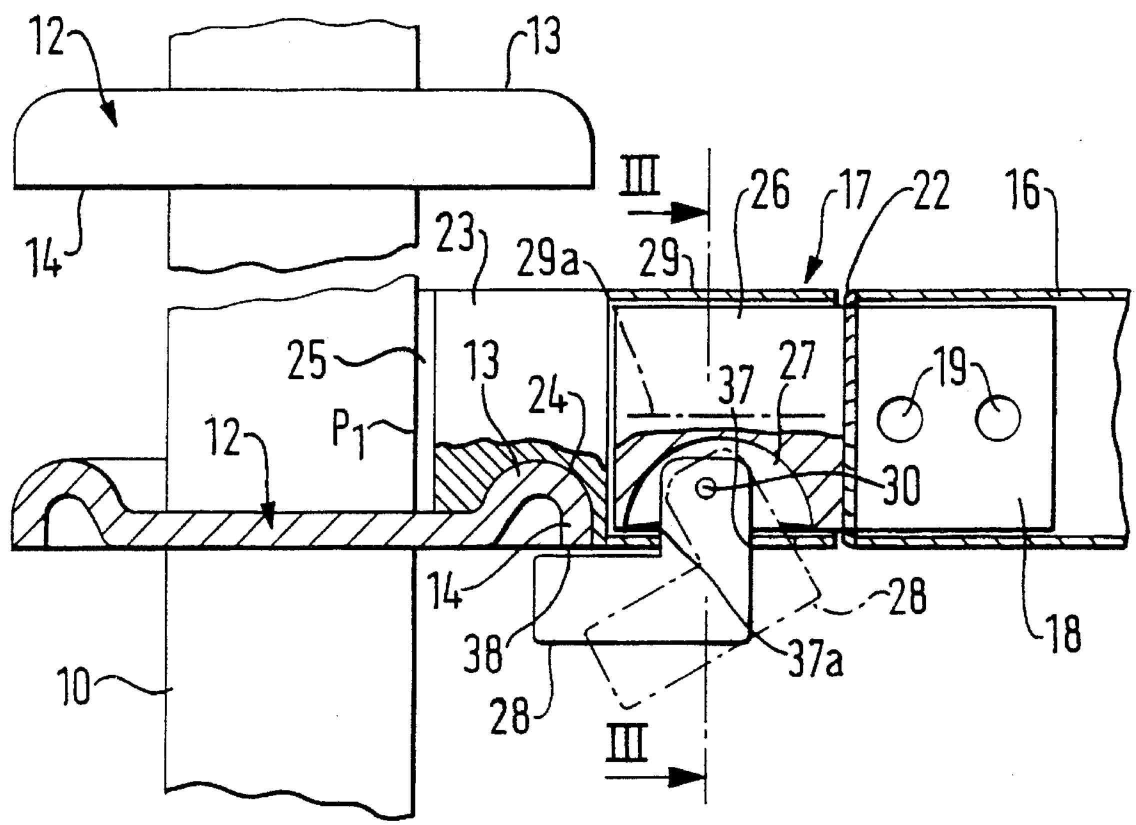
FIG. 1 is an elevation shown partly in cross-section of one form of device in accordance with the invention.
Figure 2:
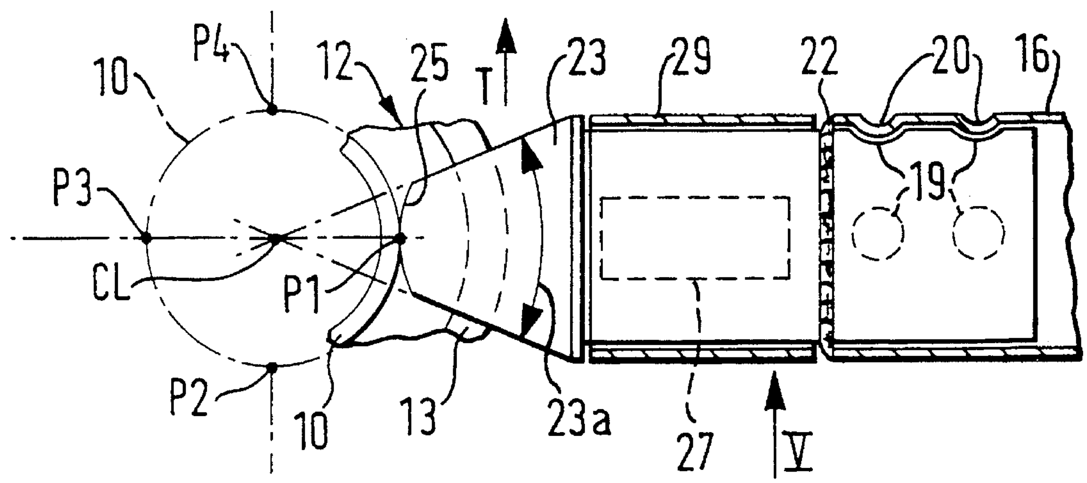
FIG. 2 is a plan view of the device shown in FIG. 1 shown partly broken away.

A horizontal scaffolding tube 16 (constituting the aforesaid second elongate member) includes an end section indicated generally at 17. The end section comprises a bar 18 having its right hand end as viewed in FIG. 1 located within the tube 16. The bar is formed with three pairs of dimples 19 and the tube 16 is punched into the dimples 19 at points 20. The dimpling secures the bar 18 within the tube 16 and is further secured, for example, by means of welding indicated at 22. The left hand end of the bar 18 is formed as a tapered connector block 23 having a locating recess 24 therein which locates on the projection 13 as shown in FIGS. 1 and 2. The connector block 23 is formed with a convex cylindrical end surface 25.

Preferably, the tapered connector block 23 defines an included angle **23*a* which is a whole fraction of a full revolution. For instance, if the included angle is 36°, up to ten identical connector blocks 23 may be installed on an annular locator 12. An additional feature of the 36° connector block angle 23*a* permits circular scaffold arrays to be assembled around cylindrical/circular structures such as oil, gas, petro-chemical or nuclear reactors of uniform, tapered or spherical cross sections. The bar 18 has an intermediate cylindrical section 26 (constituting the aforesaid "carrier") of similar diameter to the portion which locates within the tube 16. The intermediate section 26 is formed with a semi-circular slot 27 which receives a locking lever 28 of L-shape or other suitable form. The locking lever 28 is pivotally connected to the intermediate section 26 by means of a pin 30 and can pivot between the position shown in full lines where the locking lever locks the connector block 23 on to the locator 12 and the broken line position in which the connector block 23 can be lifted off the locator 12 and, therefore, disconnected from the vertical tube 10**.

Figure 3:
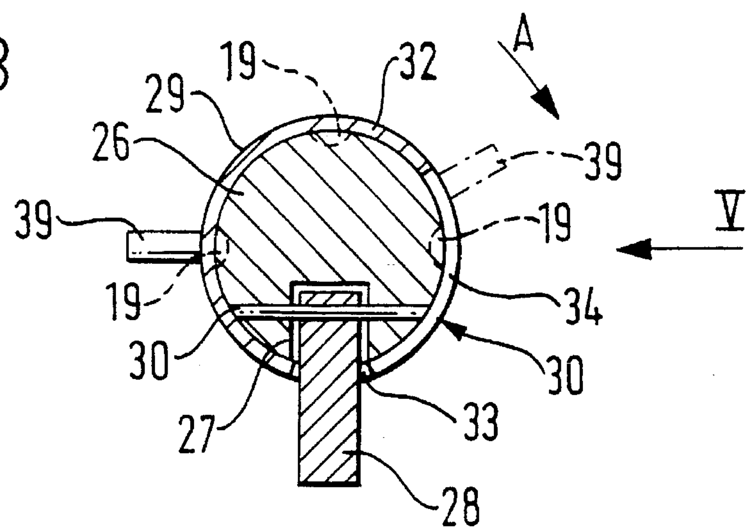
FIG. 3 is a cross-section of the device shown in FIG. 1, on the line III—III in FIG. 1.
Figure 4:
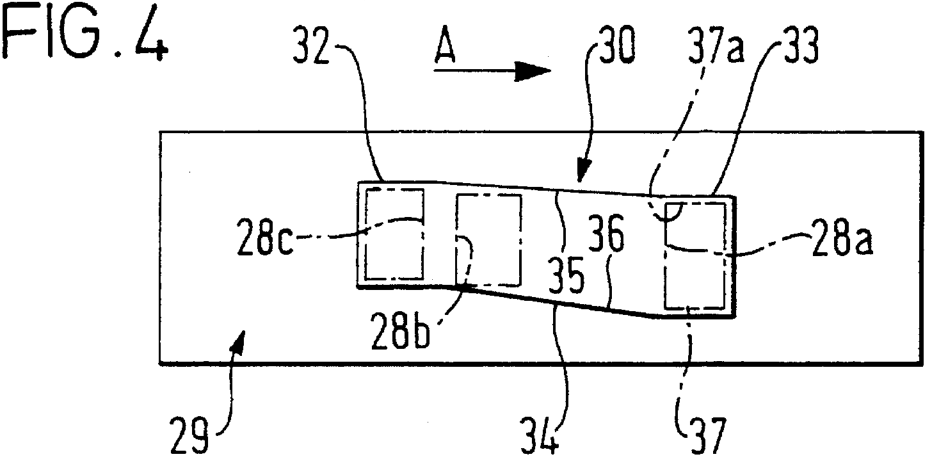
FIG. 4 illustrates a development of a cylindrical operating member used with the device shown in FIGS. 1 to 3.
Figure 5:
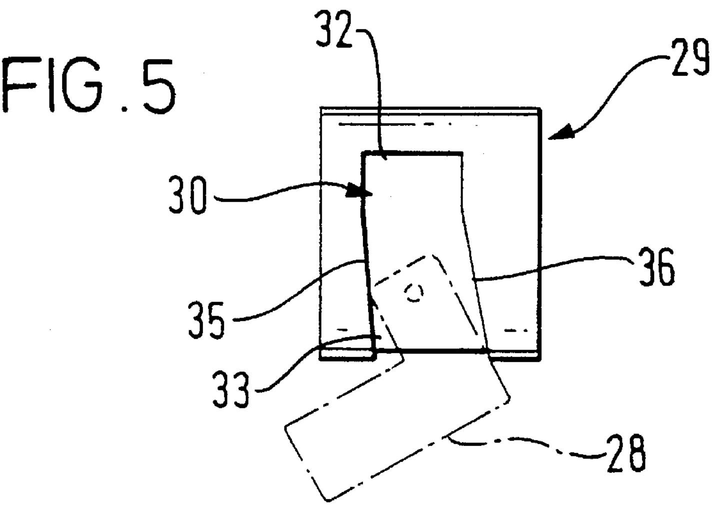
FIG. 5 is an elevation of the operating member looking in the direction of arrow V in FIG. 3.
Figure 6:
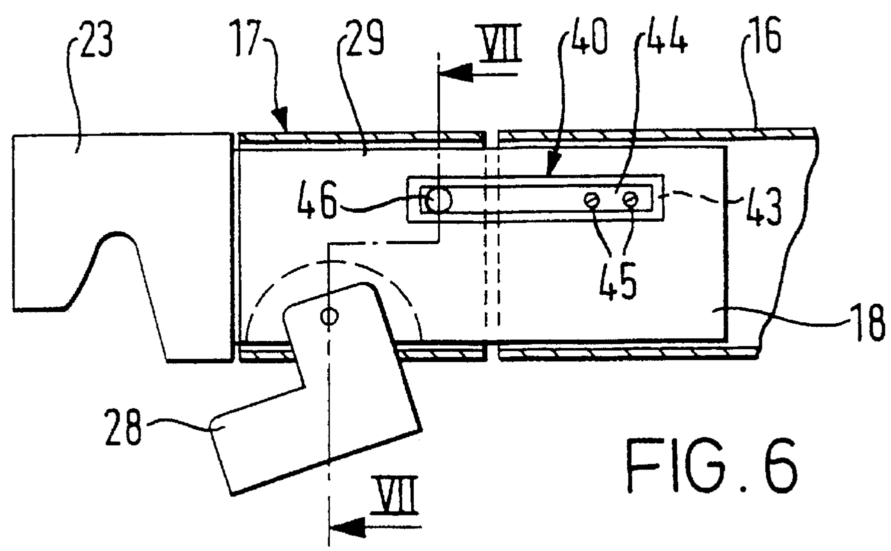
FIG. 6 is a view somewhat similar to FIG. 1 showing a secondary lock.

The intermediate section 26 also carries a cylindrical operating member 29 for the locking lever 28, the operating member being in the form of a cylindrical sleeve which can be rotated about its axis **29*a* (corresponding to the axis of the tube 16) around the periphery of the intermediate section 26. As shown in FIGS. 3, 4 and 5, the operating member 29 is formed with a slot 30 having a first end section 32, which accommodates the locking lever 28 in its full line position as shown in FIG. 1, and a second end section 33 which accommodates the locking lever in the broken line position shown in FIG. 1. The two end sections 32, 33 are interconnected by means of a tapering section 34 having edges 35, 36. In FIG. 4, the slot 30** is viewed looking at the inside surface of the developed cylindrical operating member.

In order to connect the horizontal scaffolding tube 16 to the vertical tube 10, the operating member 29 is initially positioned as shown in FIGS. 3, 4 and 5 so that the locking lever 28 can occupy the broken line position (indicated at 28a in FIG. 4). The connector block 23 is then positioned as shown in FIG. 1 with the projection 13 in recess 24. The operating member is then rotated in direction A as shown in FIGS. 3 and 4 so that the edge 36 of the slot 30 co-operates with an edge 37 of the locking lever 28 in cam-like fashion and causes the locking lever to pivot about the pin 30 towards its full line position in FIG. 1.

The locking lever 28 reaches the full line position when it is positioned short of one end of the slot as indicated at **28*b* in FIG. 4. The operating member 29 is then rotated further so as to cause a locking surface 38 of the locking lever 28 to be urged firmly against the rim 14 by cam action of the remaining length of surface 36 until the locking lever occupies the position indicated at 28C in FIG. 4 within the slot section 32. Such action clamps the locator 12 between the connector block 23 and the locking surface 38 with the convex cylindrical surface 25 in full depth line contact with the tube 10. Full line contact as shown in FIGS. 1 and 2 increases the rigidity of the connection. Also, the line contact is useful in ensuring that loading applied by two horizontal scaffolding tubes 16 arranged at right angles with line contact indicated at P1, P2 in FIG. 2 or, say, four scaffolding tubes 16 arranged at quarter positions with line contact at P1, P2, P3 and P4, is applied effectively through the center CL of the scaffolding tube 10. Such an arrangement minimizes the risk of bending or buckling of tube 10 and improves the ability of the tube 10 to support heavy loads. Therefore increased heights of scaffolding can be used with scaffolding tubes 10** at greater spacing giving improved economy to the user.

To assist a user in turning the operating member 29, a short flange 39 can be firmly secured to the operating member as shown in FIG. 3. As the slot section 32 approaches the locking lever 28 during rotation of the operating member 29, the flange 39 will move towards the broken line position in FIG. 3 and, if necessary, the final movement from positions 28B to 28C can be assisted by locating a wrench or spanner on the flange 39 and using the wrench or spanner to rotate the operating member 29.

To disconnect the tubes 16 and 10, the operating member 29 is rotated in the opposite direction so that the edge 35 of the slot 30 co-operates with an edge 37*a* of the locking lever 28 and moves the locking lever 28 positively towards its broken line position as shown in FIG. 1. The convex surface 25 also enables the connector block 23 to be released easily from the locator 12 by a transverse movement (e.g. in direction of arrow T in FIG. 2) after release of the locking lever 25.

To render the operating member somewhat tamper-resistant, a secondary lock arrangement 40 may be provided as shown in FIGS. 6 to 9.

The secondary lock arrangement comprises a leaf spring 42 which is positioned within an axially extending recess 43 formed in the bar 18. The spring 42 has an elongate section 44 secured at one end to the bar 18 by a pair of screws 45. The opposite end of the spring 42 has a projection in the form of a radial head 46 thereon which is positioned so as to project slidably through an aperture 47 formed in the operating member 29. The head 46 can be deflected inwardly in the direction of arrow B in FIG. 8 and the recess 43 is deepened at 43*a* to receive the deflected spring.

Figure 7:
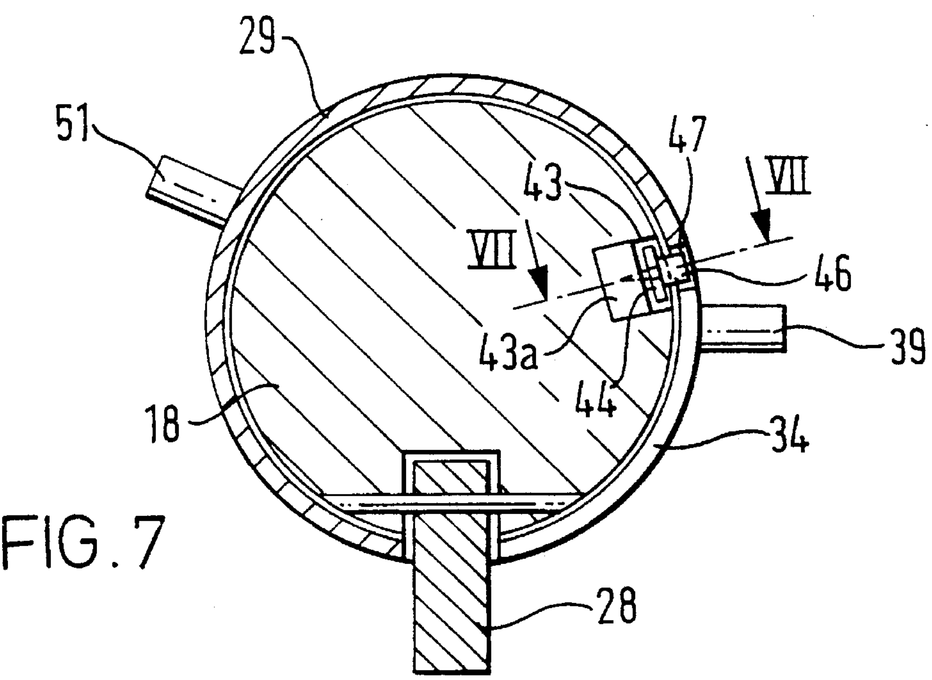
FIG. 7 is a cross-section of the arrangement shown in FIG. 6 on the line VII—VII in FIG. 6.
Figure 8:
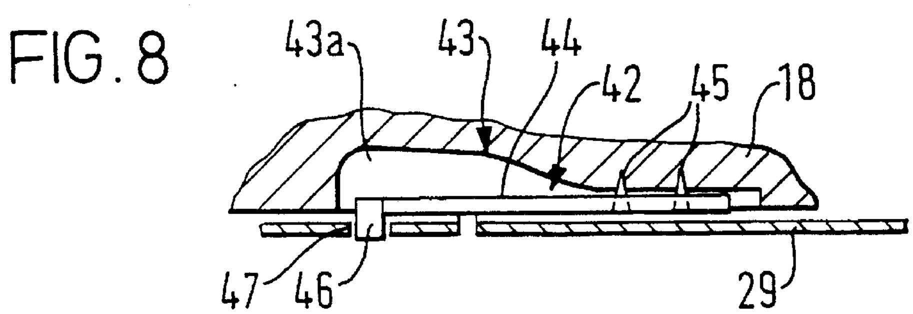
FIG. 8 is a cross-section through part of the arrangement shown in FIG. 7 on the line VIII—VIII in FIG. 7.
Figure 9:
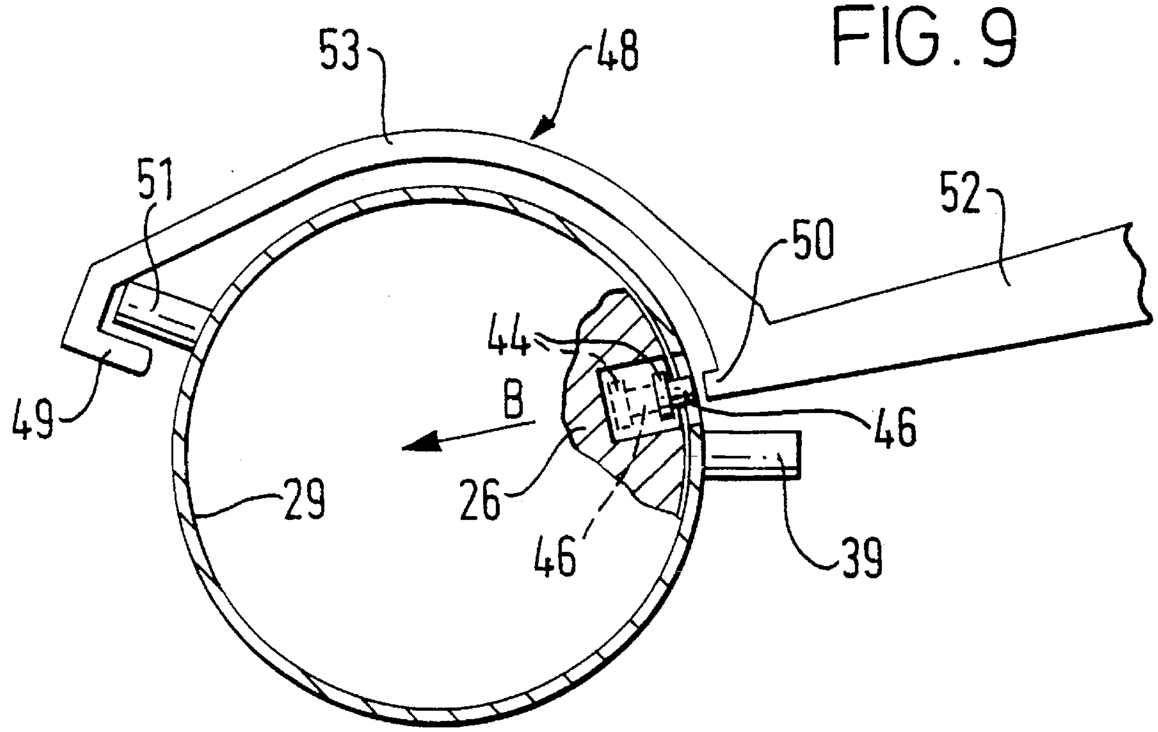
FIG. 9 is a view similar to FIG. 7 shown partly broken away and illustrating the way in which a wrench can be used to unlock the secondary lock and FIG. 10 is a view similar to FIG. 9 showing an alternative arrangement.

With the head 46 in the position shown in FIGS. 7 and 8, accidental or unauthorized rotation of the locking member 29 to release the locking lever 28 is prevented. As illustrated in FIG. 9, a C-shaped wrench 48 is provided having a handle 52 and a curved body section 53. The body section 53 has an in-turned end 49 for locating behind a flange 51 on the operating member 29 similar to flange 39. The body section 53 also has a projection 50 for contact with the spring head 46. As will be apparent from FIGS. 7, 8 and 9, the radially outer end of the spring head 46 will normally lie flush with the outer surface of the operating member 29 making the secondary lock somewhat tamper resistant. By positioning the wrench 48 as shown in FIG. 9, radially inward movement of the handle 52 in the direction of arrow B will cause the projection 50 to depress the spring head 46 so that the spring 42 enters the cavity 43*a* and the head 46 of the spring lies radially inboard of the locking member 29. Such movement of the handle 52 will eventually bring the curved body section 53 of the wrench into contact with the operating member 29. At that point, the radially inner end of the projection 50 will lie substantially flush with the radially inner surface of the operating member 29 so as not to enter the cavity 43*a*. Once the spring head 46 is depressed in that way, downward load on the handle 52 will rotate the operating member 29 clockwise as viewed in FIGS. 7 and 9 (anti-clockwise as viewed in FIG. 3) to release the locking lever 28.

By reversing the position of the wrench 48, the in-turned end 49 of the wrench can be located behind the flange 39 for turning the operating member 29 in the opposite direction to move the locking lever 28 from the broken line position to the full line position as shown in FIG. 1.

Figure 10:
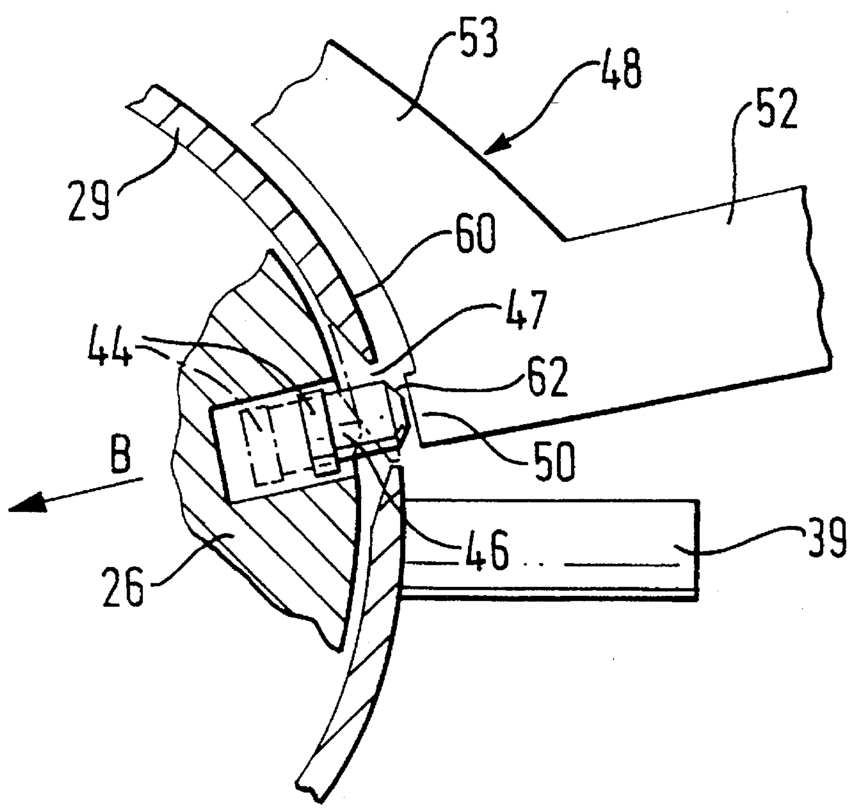

FIG. 10 shows a modified version of the secondary lock arrangement drawn to a larger scale. In FIG. 10, the inner surface of the operating member 29 is formed with an annular ramp surface 60 around the aperture 47. The wrench 48 is used as described above but the projection 50 is reduced in length. When the wrench is positioned as in FIG. 9 and moved in the direction of arrow B until the curved body section 53 contacts the operating member 29, the projection 50 pushes the spring head 46 into a position where its radially outer end is flush with the radially outer surface of the operating member 29. Whilst holding the wrench 48 in position, the operating member is rotated so that the ramp surface 60 contact a chamfer 62 on the head 46 and urges the head inwardly until it rides beneath the radially inner surface of the operating member 29 as shown in broken lines. Further clockwise rotation of the operating member 29 then releases the locking lever 28.

What is claimed is:

1. A device for connecting a first elongate member to a transverse second elongate member, the device comprising an end section for mounting on the second elongate member, a locator for mounting on the first elongate member for locating the end section, a movable locking means for mounting on the second elongate member and an operating member which enables the locking means to be moved from a position in which the end section is locked in position on the locator by the locking means to a further position in which the locking means permits the end section to be separated from the locator, the operating member being a rotary member mounted, in use, on the second elongate member and having a surface thereon which cooperates with the locking means whereby rotation of the operating member effects movement of the locking means, the rotary operating member being rotatable about the longitudinal axis of the second elongate member.

2. The device of claim 1 in which the operating member is sleeve-like.

3. The device of claim 1 in which the surface on the operating member is cam-like whereby movement of the operating member relative to the locking means to lock the end section in position on the locator causes the cam-like surface on the operating member to move the locking means.

4. The device of claim 1 in which the locking means is arranged to move into a locking position to enable that a locking surface of the locking means to lie adjacent part of the locator with the locator adapted to be disposed in captive-manner between the locking surface of the locking means and the end section.

5. The device of claim 1 in which the locking means includes a lever and means for mounting the lever pivotally on the second elongate member in a position adjacent the end section.

6. The device according to claim 1 in which the end section has a convex end surface which, in use, is adapted to lie in contact with the first elongate member.

7. The device according to claim 6 in which, in use, the convex end surface is adapted to lie in line contact with the first elongate member.

8. A device for connecting a first elongate member to a transverse second elongate member, the device comprising an end section for mounting on the second elongate member, a locator for mounting on the first elongate member for locating the end section, a movable locking means for mounting on the second elongate member and an operating member which enables the locking means to be moved from a position in which the end section is locked in position on the locator by the locking means to a further position in which the locking means permits the end section to be seperated from the locator, the operating member being a rotary member mounted, in use, on the second elongate member and having a surface thereon which cooperates with the locking means whereby rotation of the operating member effects movement of the locking means, the surface on the operating member being cam-like whereby movement of the operating member relative to the locking means to lock the end section in position on the locator causes the cam-like surface on the operating member to move the locking means, two opposite cam-like surfaces being provided one of which moves the locking means towards a locked position when rotating the operating member in one sense and the other of which moves the locking means towards an unlocked position when rotating the operating member in an opposite sense.

9. The device of claim 8 in which the locking means is arranged to move into the locked position to enable a locking surface of the locking means to lie adjacent part of the locator with the locator adapted to be disposed in captive-manner between the locking surface of the locking means and the end section.

10. The device of claim 8 in which the locking means includes a lever and means for pivotally mounting the lever on the second elongate member in a position adjacent the end section.

11. The device according to claim 8 in which the end section has a convex end surface which, in use, is adapted to lie in contact with the first elongate member.

12. The device according to claim 11 in which, in use, the convex end surface is adapted to lie in line contact with the first elongate member.

13. A device for connecting a first elongate member to a transverse second elongate member, the device comprising an end section for mounting on the second elongate member, a locator for mounting on the first elongate member for locating the end section, a movable locking means for mounting on the second elongate member and an operating member which enables the locking means to be moved from a position in which the end section is locked in position on the locator by the locking means to a further position in which the locking means permits the end section to be seperated from the locator, the operating member being a rotary member mounted, in use, on the second elongate member and having a surface thereon which cooperates with the locking means whereby rotation of the operating member effects movement of the locking means, the surface on the operating member being cam-like whereby movement of the operating member relative to the locking means to lock the end section in position on the locator causes the cam-like surface on the operating member to move the locking means, the operating member being sleeve like and the cam-like surface being defined by a circumferentially extending slot in the operating member, the slot also extending axially of the operating member whereby rotational movement of the operating member will cause the surface to move the locking means.

14. The device of claim 13 in which the locking means is arranged to move into a locking position to enable a locking surface of the locking means to lie adjacent part of the locator with the locator adapted to be disposed in captive-manner between the locking surface of the locking means and the end section.

15. The device of claim 13 in which the locking means includes a lever and means for pivotally mounting the lever on the second elongate member in a position adjacent the end section.

16. The device according to claim 13 in which the end section has a convex end surface which, in use, is adapted to lie in contact with the first elongate member.

17. The device according to claim 16 in which, in use, the convex end surface is adapted to lie in line contact with the first elongate member.

18. A device for connecting a first elongate member to a transverse second elongate member, the device comprising an end section for mounting on the second elongate member, a locator for mounting on the first elongate member for locating the end section, a movable locking means for mounting on the second elongate member and an operating member which enables the locking means to be moved from a position in which the end section is locked in position on the locator by the locking means to a further position in which the locking means permits the end section to be separated from the locator, the operating member being a rotary member mounted, in use, on the second elongate member and having a surface thereon which cooperates with the locking means whereby rotation of the operating member effects movement of the locking means, secondary locking means being provided to prevent unwanted movement of the operating member once the operating member has moved the locking means into a position where the end section is locked in position on the locator, the secondary locking means including a projection which is normally biased towards a locking position so as to extend past an edge of the operating member and which is displaceable to a position clear of the edge to permit movement of the operating member.

19. The device of claim 18 in which the edge is the edge of an aperture in the operating member which receives the projection.

20. The device according to claim 18 in which an unlocking device is provided for displacing the secondary locking means from the locking position towards a release position, including a first section arranged to locate on part of the operating member and a second section provided with a surface which is arranged to displace the secondary locking means from its locking position towards its release position.

21. The device of claim 18 in which the locking means is arranged to move into a locking position to enable a locking surface of the locking means to lie adjacent part of the locator adapted to be disposed in captive-manner between the locking surface of the locking means and the end section.

22. The device of claim 18 in which the locking means includes a lever and means for pivotally mounting the lever on the second elongate member in a position adjacent the end section.

23. The device according to claim 18 in which the end section has a convex end surface which, in use, is adapted to lie in contact with the first elongate member.

24. The device according to claim 23 in which, in use, the convex end surface is adapted to lie in line contact with the first elongate member.

25. A device for connecting a first elongate member to a transverse second elongate member, the device comprising an end section for mounting on the second elongate member, a locator for mounting on the first elongate member for locating the end section, a movable locking means for mounting on the second elongate member and an operating member which enables the locking means to be moved from a position in which the end section is locked in position on the locator by the locking means to a further position in which the locking means permits the end section to be separated from the locator, the operating member being a rotary member mounted, in use, on the second elongate member and having a surface thereon which cooperates with the locking means whereby rotation of the operating member effects movement of the locking means, secondary locking means being provided to prevent unwanted movement of the operating member once the operating member has moved the locking means into a position where the end section is locked in position on the locator, an unlocking device being provided for displacing the secondary locking means from a locking position towards a release position and the operating member being formed with a ramp-like surface which, on rotation of the operating member to release the locking means, further displaces the secondary locking means into its release position.

26. The device of claim 25 in which the locking means is arranged to move into a locking position to enable a locking surface of the locking means to lie adjacent part of the locator adapted to be disposed in captive-manner between the locking surface of the locking means and the end section.

27. The device of claim 25 in which the locking means includes a lever and means for pivotally mounting the lever on the second elongate member in a position adjacent the end section.

28. The device according to claim 25 in which the end section has a convex end surface which, in use, is adapted to lie in contact with the first elongate member.

29. The device according to claim 28 in which in use, the convex end surface is adapted to lie in line contact with the first elongate member.

* * * * *